United States Patent
Ahn et al.

(10) Patent No.: US 9,588,577 B2
(45) Date of Patent: Mar. 7, 2017

(54) ELECTRONIC SYSTEMS INCLUDING HETEROGENEOUS MULTI-CORE PROCESSORS AND METHODS OF OPERATING SAME

(71) Applicants: Min Seon Ahn, Hwaseong-Si (KR); Ki Soo Yu, Yongin-Si (KR); Jae Choon Kim, Incheon (KR); Chi Gwan Oh, Suwon-Si (KR); Myung Kyoon Yim, Seoul (KR)

(72) Inventors: Min Seon Ahn, Hwaseong-Si (KR); Ki Soo Yu, Yongin-Si (KR); Jae Choon Kim, Incheon (KR); Chi Gwan Oh, Suwon-Si (KR); Myung Kyoon Yim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 91 days.

(21) Appl. No.: 14/505,952

(22) Filed: Oct. 3, 2014

(65) Prior Publication Data

US 2015/0121105 A1    Apr. 30, 2015

(30) Foreign Application Priority Data

Oct. 31, 2013    (KR) .................. 10-2013-0131589

(51) Int. Cl.
*G06F 1/32*    (2006.01)
*G06F 9/50*    (2006.01)
*G06F 1/20*    (2006.01)

(52) U.S. Cl.
CPC ............ *G06F 1/3293* (2013.01); *G06F 1/206* (2013.01); *G06F 1/3206* (2013.01); *G06F 1/329* (2013.01); *G06F 9/5094* (2013.01); *Y02B 60/142* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 6,901,521 B2 | 5/2005 | Chauvel et al. |
| 6,908,227 B2 | 6/2005 | Rusu et al. |
| 7,086,058 B2 | 8/2006 | Luick |
| 7,144,152 B2 | 12/2006 | Rusu et al. |
| 7,167,993 B1 | 1/2007 | Thomas et al. |
| 7,194,645 B2 | 3/2007 | Bieswanger et al. |
| 7,275,248 B2 | 9/2007 | Nishida |
| 7,392,414 B2 | 6/2008 | Bailey et al. |

(Continued)

FOREIGN PATENT DOCUMENTS

| | | |
|---|---|---|
| JP | 08-016531 | 1/1996 |
| JP | 2002-189602 | 7/2002 |

(Continued)

*Primary Examiner* — Zahid Choudhury
(74) *Attorney, Agent, or Firm* — Volentine & Whitt, PLLC

(57) ABSTRACT

A method of operating an electronic system including a heterogeneous multi-core processor is provided. The method includes measuring the temperature and/or workload of a big (high-performance) core and switching a current core load from the big core to a small (low-power) core in response to the measured temperature and workload of the big core.

10 Claims, 14 Drawing Sheets

(56) References Cited

U.S. PATENT DOCUMENTS

| | | |
|---|---|---|
| 7,454,631 B1 | 11/2008 | Laudon et al. |
| 7,460,932 B2 | 12/2008 | Johns et al. |
| 7,512,513 B2 | 3/2009 | Johns et al. |
| 7,584,369 B2 | 9/2009 | Capps, Jr. et al. |
| 7,596,430 B2 | 9/2009 | Aguilar, Jr. et al. |
| 7,617,403 B2 | 11/2009 | Capps, Jr. et al. |
| 7,770,176 B2 | 8/2010 | Maeda et al. |
| 7,784,050 B2 | 8/2010 | Harris |
| 7,793,291 B2 | 9/2010 | Arai et al. |
| 7,831,842 B2 | 11/2010 | Adachi et al. |
| 7,877,751 B2 | 1/2011 | Maeda et al. |
| 7,886,172 B2 | 2/2011 | Bose et al. |
| 7,934,110 B2 | 4/2011 | Finkelstein et al. |
| 7,954,101 B2 | 5/2011 | Adachi et al. |
| 7,992,151 B2 * | 8/2011 | Warrier ............... G06F 9/5077 702/132 |
| 8,032,772 B2 | 10/2011 | Allarey et al. |
| 8,074,110 B2 | 12/2011 | Vera et al. |
| 8,209,493 B2 | 6/2012 | Rotithor |
| 8,214,660 B2 | 7/2012 | Capps, Jr. et al. |
| 8,224,693 B2 | 7/2012 | Lukose et al. |
| 8,356,197 B2 | 1/2013 | Allarey et al. |
| 8,424,006 B2 | 4/2013 | Jacobson et al. |
| 8,949,633 B2 * | 2/2015 | Belmont ............... G06F 1/3228 713/300 |
| 2004/0024874 A1 * | 2/2004 | Smith .................. G06F 9/5088 709/225 |
| 2004/0122973 A1 | 6/2004 | Keck et al. |
| 2004/0215987 A1 * | 10/2004 | Farkas ................. G06F 1/3203 713/300 |
| 2006/0095911 A1 | 5/2006 | Uemura et al. |
| 2006/0095913 A1 | 5/2006 | Bodas et al. |
| 2007/0198134 A1 | 8/2007 | Adachi et al. |
| 2008/0115010 A1 | 5/2008 | Rothman et al. |
| 2009/0089792 A1 | 4/2009 | Johnson et al. |
| 2009/0222654 A1 * | 9/2009 | Hum .................... G06F 13/24 713/100 |
| 2011/0023039 A1 | 1/2011 | Memik et al. |
| 2011/0138395 A1 | 6/2011 | Wolfe |
| 2011/0191776 A1 | 8/2011 | Bose et al. |
| 2011/0307723 A1 | 12/2011 | Cupps et al. |
| 2011/0320766 A1 | 12/2011 | Wu et al. |
| 2012/0066535 A1 | 3/2012 | Naffziger |
| 2012/0144394 A1 | 6/2012 | Prabhakar et al. |
| 2012/0216064 A1 | 8/2012 | Ko et al. |
| 2012/0240123 A1 | 9/2012 | Prabhakar et al. |
| 2012/0254643 A1 | 10/2012 | Fetzer et al. |
| 2012/0266174 A1 | 10/2012 | Inoue |
| 2012/0272078 A1 * | 10/2012 | Anderson ............. H02J 7/0091 713/320 |
| 2012/0284547 A1 | 11/2012 | Culbert et al. |
| 2013/0047142 A1 | 2/2013 | Bates et al. |
| 2013/0047166 A1 | 2/2013 | Penzes et al. |
| 2013/0073875 A1 * | 3/2013 | Anderson ............. G06F 1/3293 713/300 |
| 2014/0173311 A1 * | 6/2014 | Park .................... G06F 1/206 713/320 |
| 2014/0298060 A1 * | 10/2014 | Hooker ................ G06F 1/3293 713/323 |
| 2015/0143048 A1 * | 5/2015 | Lee .................... G06F 12/0811 711/122 |
| 2015/0309560 A1 * | 10/2015 | Liang .................. G06F 1/3293 713/320 |

FOREIGN PATENT DOCUMENTS

| | | |
|---|---|---|
| JP | 2004-126968 | 4/2004 |
| JP | 2004-240669 | 8/2004 |
| JP | 2006-277637 | 10/2006 |
| JP | 2009-110404 | 5/2009 |
| JP | 2010-231511 | 10/2010 |
| JP | 2011-014155 | 1/2011 |
| JP | 2011-197715 | 10/2011 |
| JP | 2013-025541 | 2/2013 |
| KR | 1020110128023 A | 11/2011 |
| KR | 1020120131797 A | 12/2012 |

* cited by examiner

ELECTRONIC SYSTEMS INCLUDING HETEROGENEOUS MULTI-CORE PROCESSORS AND METHODS OF OPERATING SAME

CROSS-REFERENCE TO RELATED APPLICATIONS

This application claims priority under 35 U.S.C. §119(a) from Korean Patent Application No. 10-2013-0131589 filed on Oct. 31, 2013, the disclosure of which is hereby incorporated by reference in its entirety.

BACKGROUND

The inventive concept relates to electronic systems including a low-power core and a high-performance core, as well as methods of operating same.

In order to selectively provide high speed performance with relatively high power consumption and low speed performance with relatively low power consumption, certain mobile application processors include separate "high-performance" and "low-power" processing "cores". Such differently configured cores provide different system performance capabilities, benefits and limitations, and are commonly integrated in a single chip. Of course, the high-performance core not only consumes more power, but also generates more heat. In contrast, the low-power core consumes less power and generate less heat, but such advantages come at the cost of slower (or fewer) processing capabilities.

When the computational "load" placed upon a multi-core, central processing unit (CPU) increases to a first threshold during operation of a low-power core, the CPU may switch execution of the load from the low-power core to a high-performance core in order to complete the set of tasks forming the load in a timely manner. Analogously, when the load placed on the CPU falls below a second threshold, execution of the load may be switched from the high-performance core to the low-power core in order to conserves power.

SUMMARY

According to some embodiments of the inventive concept, there is provided a method of operating an electronic system including a heterogeneous multi-core processor including a big core and a little core. The method includes measuring a temperature of the big core and determining a current core load associated with the big core; and switching a current core load for the big core to the little core in response to the measured temperature and the determined current core load, the big core is a relatively high-performance/high-power consumption core and the little core is a relatively low-performance/low-power consumption core.

The big core is dynamically mapped to the little core to form a core pair, and switching the current core load from the big core to the little core comprises in-kernel switching such that only one of the big core and little core in the core pair is activated at any given time.

The big core is statically mapped to the little core to form a core pair, and switching the current core load from the big core to the little core comprises in-kernel switching such that only one of the big core and little core in the core pair is activated at any given time.

The switching the current core load from the big core to the little core may includes, reassigning at least one task making up the current core load to the little core for execution when the measured temperature of the big core reaches a first temperature threshold, and performing at least one of clock gating and power gating on the big core.

The reassigning of the at least one task may include migrating a job queue storing remaining tasks of the current core load for the big core to the small core.

The migrating of the job queue for the big core to the small core may include swapping use of a normal dynamic voltage and frequency scaling (DVFS) table for the big core for use of a throttled DVFS table defining a performance range for only the small core.

The normal DVFS table and the throttled DVFS table are different from each other in defining respective performance ranges for the small core.

The heterogeneous multi-core processor may include a plurality of big cores, and the normal DVFS table and the throttled DVFS table are different according to a number of activated big cores among the plurality of big cores.

The method may further include migrating the job queue for the little core back to the big core when the measured temperature of the big core falls below a second temperature threshold lower than the first temperature threshold.

The measuring of the temperature of the big core is performed using a temperature sensor integrated with the big core.

According to other embodiments of the inventive concept, there is provided a method of operating an electronic system including a heterogeneous multi-core processor comprising a first big core cluster including a first big core and a second big core disposed physically adjacent to the first big core, and a little core cluster including a first little core and a second little core, wherein the first and second big cores are respectively high-performance/high-power consumption cores and the first and second little cores are respectively low-performance/low-power consumption cores. The method includes measuring a temperature of the first big core using a temperature sensor, switching at least one task from a first current core load assigned the first big core to the first little core when the measured temperature of the first big core exceeds a first temperature threshold, and switching at least one task from a second current core load assigned the second big core to the second little core when the measured temperature of the first big core exceeds a second temperature threshold higher than the first temperature threshold.

The method may further include mapping the first big core onto the first little core to form a first core pair, and mapping the second big core onto the second little core to form a second core pair, wherein the switching of the at least one task from the first current core load to the first little core comprises in-kernel switching such that only one of the first big core and first little core in the first core pair is activated at any given time, and the switching of the at least one task from the second current core load to the second little core comprises in-kernel switching such that only one of the second big core and second little core in the second core pair is activated at any given time.

The method may further include performing at least one of clock gating and power gating on at least one of the first big core and the second big core until the measured temperature of the first big core falls below a third temperature threshold less than the first temperature threshold.

The switching of the at least one task from the first current core load to the first little core may include migrating a first job queue storing remaining tasks of the first current core load for the first big core to the first small core, and the switching of the at least one task from the second current core load to the second little core may include migrating a second job queue storing remaining tasks of the second current core load for the second big core to the second small core.

The migrating of the first job queue for the first big core to the first small core may include swapping use of a first normal dynamic voltage and frequency scaling (DVFS) table for the first big core for use of a first throttled DVFS table defining a performance range for only the first small core, and the migrating of the second job queue for the second big core to the second small core may include swapping use of a second DVFS table for the second big core for use of a second throttled DVFS table defining a performance range for only the second small core.

The first normal DVFS table and the first throttled DVFS table are different from each other in defining respective performance ranges for the first small core, and the second normal DVFS table and the second throttled DVFS table are different from each other in defining respective performance ranges for the second small core.

The first and second normal DVFS tables and the first and second throttled DVFS tables vary according to a number of activated big cores among a plurality of big cores in the heterogeneous multi-core processor.

The method may further include switching the first current core load from the first little core back to the first big core when the measured temperature of the first big core falls below a third temperature threshold, and switching the second current core from the second little core back to the second big core when the measured temperature of the first big core falls below a fourth temperature.

According to still other embodiments of the inventive concept, there is provided an electronic system including a heterogeneous multi-core processor including a core pair including a first type core providing high-performance with high-power consumption, and a second type core providing low-performance with low-power consumption relative to the first type core, and a kernel configured to apply a different dynamic voltage and frequency scaling (DVFS) table to the core pair in response to a measured temperature for the first type core.

The kernel is configured to apply a normal DVFS table to the core pair so long as the measured temperature of the first type core remains less than or equal to a first temperature threshold, and the kernel is further configured to apply a throttled DVFS table to the core pair when the measured temperature of the first type core exceeds the first temperature threshold.

BRIEF DESCRIPTION OF THE DRAWINGS

The above and other features and advantages of the inventive concept will become more apparent upon consideration of certain exemplary embodiments thereof with reference to the attached drawings in which.

DETAILED DESCRIPTION

Certain embodiments of the inventive concept will now be described in some additional detail with reference to the accompanying drawings. This inventive concept may, however, be embodied in many different forms and should not be construed as being limited to only the illustrated embodiments. Rather, these embodiments are provided so that this disclosure will be thorough and complete and will fully convey the scope of the inventive concept to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
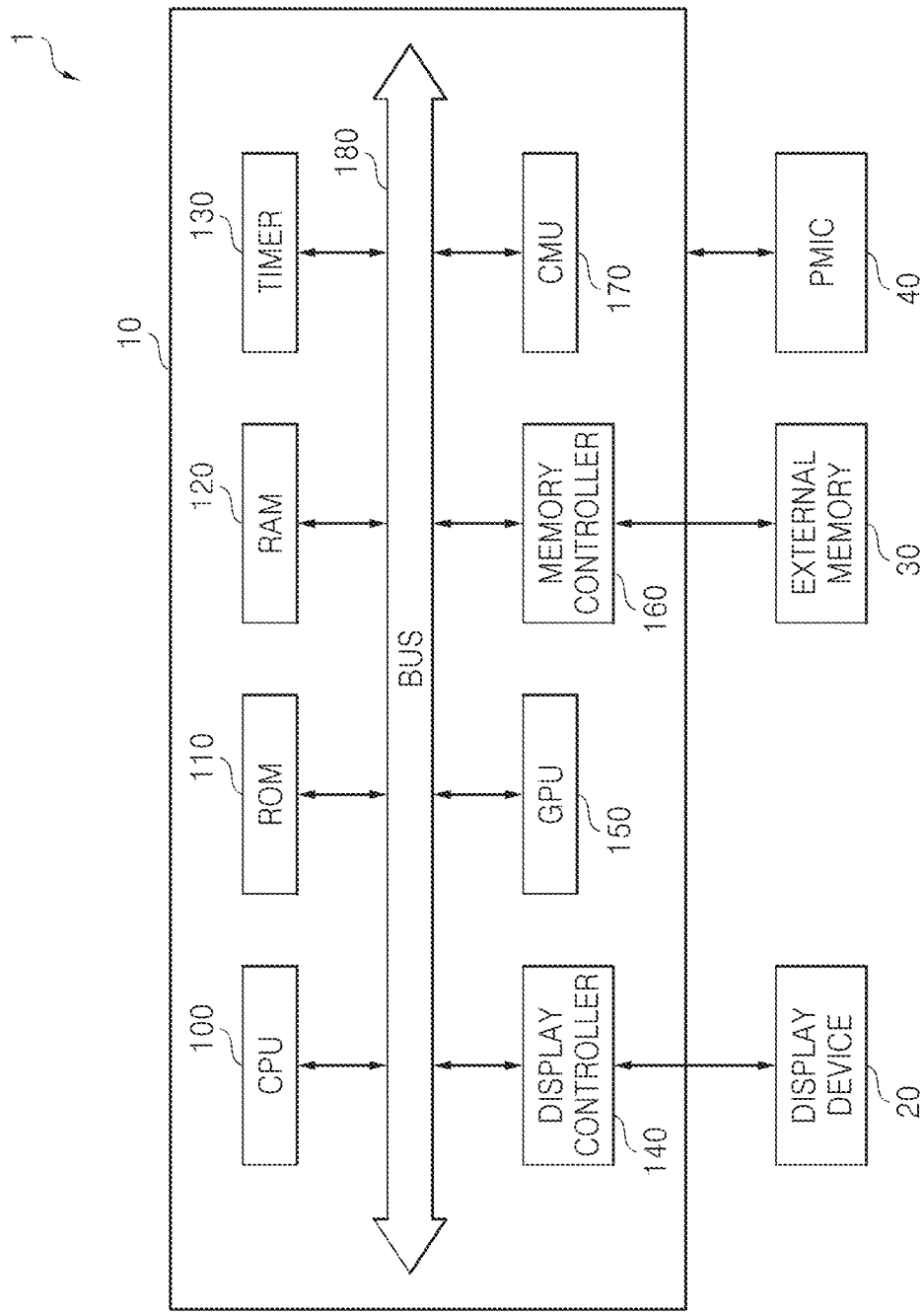
FIG. 1 is a block diagram of an electronic system according to embodiments of the inventive concept.

Figure (FIG.) 1 is a block diagram illustrating an electronic system 1 according to embodiments of the inventive concept. Referring to FIG. 1, the electronic system 1 may be implemented as a handheld device such as a mobile telephone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book. The electronic system 1 may include a System-on-Chip (SoC) 10, an external memory 30, and a display device 20.

The SoC 10 may include a central processing unit (CPU) 100, a read-only memory (ROM) 110, a random access memory (RAM) 120, a timer 130, a display controller 140, a graphics processing unit (GPU) 150, a memory controller 160, a clock management unit (CMU) 170, and a bus 180. Those skilled in the art will appreciate that the SoC 10 will include other elements.

The electronic system 1 also includes a power management integrated circuit (PMIC) 40. The PMIC 40 may be implemented external to the SoC 10 in certain embodiments of the inventive concept. Alternately, the SoC 10 may include a power management unit (PMU) capable of implementing the functionality described herein in relation to the PMIC 40.

The CPU 100 (or alternately used term "processor") may be used to execute commands, instructions, and programs received (e.g.,) from the external memory 30, together with associated data. For instance, the CPU 100 may execute certain programs in relation to associated data in accordance with an operating clock signal provided by (e.g.,) the CMU 170.

In the illustrated embodiments that follow, the CPU 100 is assumed to include multiple heterogeneous cores. In this context, the term "heterogeneous" does not mean that all cores in a multi-core CPU are of different type. Rather, this term indicates that at least two (2) of the cores provided by a multi-core CPU are sufficiently different in type and/or configuration so as to exhibit materially different computational speeds and/or power consumption requirements. Thus, CPU 100 may be understood as a "multi-core processor" operating as a single computational component within the electronic system 1, wherein the two or more cores function independently as separate, albeit coordinated, processors capable of receiving, interpreting and executing program commands, instructions, code, etc., hereafter singularly or collectively referred to in all of its possible variety as "program instructions".

Thus, program instructions and associated data may be stored in the ROM 110, RAM 120, and/or external memory 30 and may be loaded to an execution memory (not shown) associated with CPU 100, for example, during program execution. For example, in certain embodiments of the inventive concept, the ROM 110 may be used to store program instructions and/or associated data using non-volatile memory. Thus, the ROM 110 may be implemented as erasable programmable Read-Only-Memory (ROM) or EPROM, or as electrically erasable programmable ROM or EEPROM, such as flash memory.

The RAM 120 may be used to temporarily store program instructions and/or associated data using volatile memory. Hence, program instructions and/or associated data stored in ROM 110 or external memory 30 may be temporarily stored in the RAM 120 under the control of the CPU 100 or in response to execution of boot code retrieved from the ROM 110. Thus, the RAM 120 may be implemented as dynamic Random Access Memory (RAM) or DRAM, or static RAM or SRAM.

The timer 130 may be used to provide certain count values serving as (or indicating) timing control signals based on (e.g.,) one or more operating clock signals provided by the CMU 170.

The GPU 150 may be sued to convert data read by the memory controller 160 from the external memory 30 into a data suitable for efficient display by the display device 20.

The CMU 170 may be used to generate one or more clock signal(s), and may include a clock signal generator, such as a phase locked loop (PLL), a delay locked loop (DLL), or a crystal oscillator. In certain embodiments, one or more operating clock signal(s) may be provide to the GPU 150, CPU 100, and/or memory controller 160. Of further note, the CMU 170 may be sued to change the frequency of any one of the operating clock signal(s) in response to systems considerations such as remaining available power, one or more system temperatures, etc.

As noted above, the CPU 100 is assumed to include at least two heterogeneous cores (e.g., a first type core and a second type core). In certain embodiments, the CPU 100 is assumed to further include at least a third type core. Hereinafter, the first type core is assumed to be a high-performance core and will be referred to as a "big core", while the second type core is assumed to be a low-power core and will be referred to as a "little core"-consistent with the foregoing description of these terms.

During execution of a set of tasks defined by corresponding program instructions and/or associated data, that may collectively be referred to as a "CPU load", the CPU 100 may initially assign one or more tasks from the set of tasks for execution by a little core. Thereafter, the CPU may determine a current core load for the little core and adjust an operating frequency for a controlling clock signal applied to the little core in view of the current core load. In this context, those skilled in the art will understand that the term "current core load" will vary from moment to moment with respect to a particular core as more tasks are assigned, and/or as already assigned tasks are completed.

In certain embodiments, the CPU 100 may be used to switch a current core load from a little core to a big core when the current core load for the little core exceeds a "first workload threshold". The first workload threshold will be defined in relation to little core's processing capabilities and the respective task execution windows within the electronic system 1. Analogously, the CPU 100 may also be used to switch a current core load from a big core to a small core when the current core load for the big core falls below a "second workload threshold". Here again, the second workload threshold will be defined in relation to the big core's processing capabilities, the little core's processing capabilities and the respective task execution windows within the electronic system 1.

The memory controller 160 essentially serves as an interface with the external memory 30, and may be used to control the overall operation of the external memory 30 and the exchange of data between one or more host(s) and the external memory 30. For instance, the memory controller 160 may control the writing of data to and reading of data from the external memory 30 in response to request(s)

received from a host. Here, a host may be a master device such as the CPU 100, GPU 150, or display controller 140.

The external memory 30 will be implemented as storage media (e.g., nonvolatile and/or volatile semiconductor memory) capable of storing various program instructions, such as those used to functionally implement an operating system (OS), various applications, and/or associated data. In certain embodiments, the external memory 30 may be implemented using one or more types of RAM, such as flash memory, phase-change RAM (PRAM), magnetic RAM (MRAM), resistive RAM (ReRAM) or ferroelectric RAM (FeRAM).

In certain other embodiments of the inventive concept, the external memory 30 may be integrally provided as an embedded memory of the SoC 10. Alternately or additionally, the external memory 30 may implemented as an embedded multimedia card (eMMC) or as a universal flash storage (UFS).

As will be appreciated by those skilled in the art the bus 180 in any number of specific configurations may be used to facilitate, wholly or in part, the exchange of program instructions and/or associated data between the foregoing elements and components.

The display device 20 may be used to display image signals provided (e.g.,) from the display controller 140 specifically configured to control the operation of the display device 20. The display device 20 may be implemented as a liquid crystal display (LCD) device, a light emitting diode (LED) display device, an organic LED (OLED) display device, an active-matrix OLED (AMOLED) display device, or a flexible display device.

Figure 2:
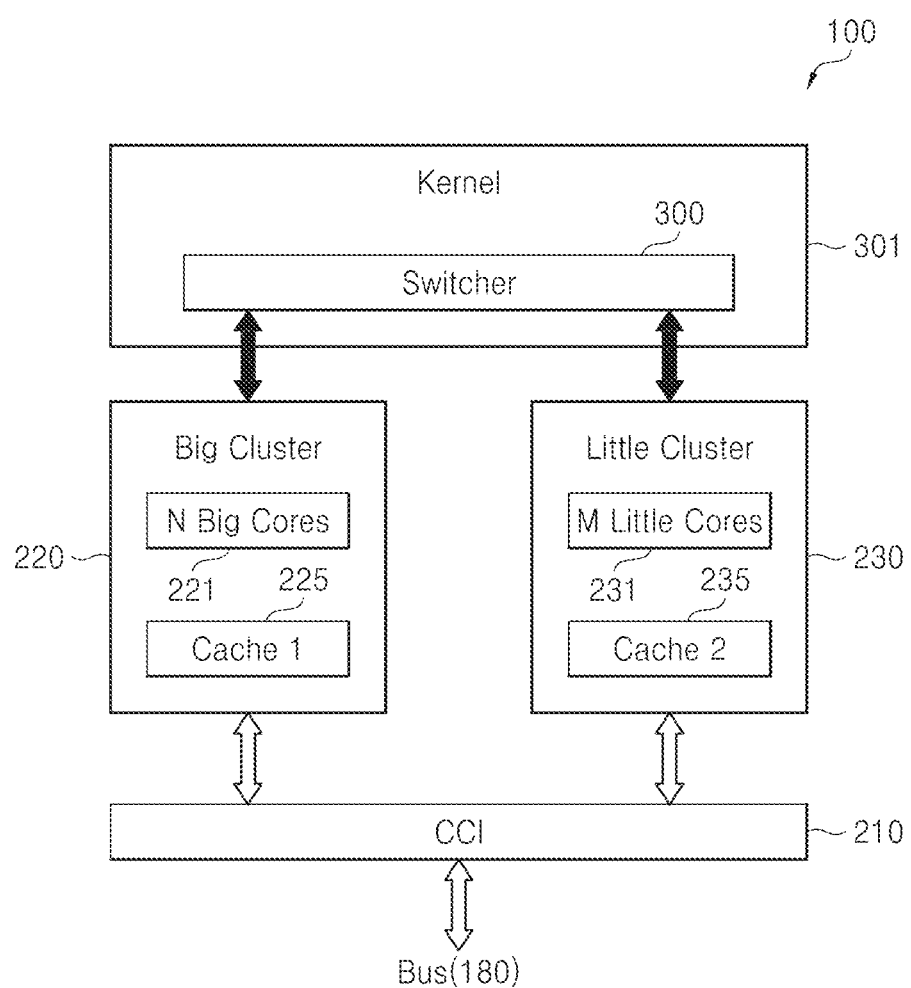
FIG. 2 is a block diagram further illustrating in one example the central processing unit (CPU) 100 of FIG. 1.

FIG. 2 is a block diagram further illustrating in one example the CPU 100 of FIG. 1. Referring to FIGS. 1 and 2, the CPU 100 is assumed to include a big cluster 220, a little cluster 230, a kernel 301, and a cache coherent interconnect (CCI) 210.

At least one application is assumed to be running on the CPU 100 that enables selective operation of particular core(s) in relation to one or more tasks. Thus, the kernel 301 will receive a set (or sequence) of tasks in response to the application, and will then assign resources (e.g., one or more cores) from a certain cluster to the execution of the task(s).

In FIG. 2, it is further assumed that big cluster 220 includes 'N' big cores 221 operating in conjunction with a first cache 225, and the little cluster 230 includes 'M' little cores 231 operating in conjunction with a second cache 235. Here, the variables N and M are positive integers greater than 1, and may be equal to one another or be different values. The N big cores 221 are characterized by high power consumption and high operating frequency, where the M little cores 231 are characterized by low power consumption and low operating frequency.

In this regard, the CPU 100 is capable of "driving" (e.g., functionally assigning for execution) appropriate task(s) onto one or more of the N big cores 221 or one or more of the M little cores 231 in accordance with a current core load, as determined (e.g.,) by an application running on the CPU 100.

In this manner, the CPU 100 is able to control the assignment of tasks to big cores 221 and little cores 231 according to a number of externally provided request(s), different user configuration(s), volume and/or quality of received data, different system configuration, thermal conditions etc. In this manner, the SoC 10 of FIG. 1 may be operated reliably with improved trade-off between (e.g.,) performance and power consumption.

Thus, when a current core load determined at a first time in relation to a little core 231 exceeds a predefined first workload threshold, the kernel 301 will switch the current core load from the little core 231 to an available big core 221. Then, at a later second time, if the current core load of the big core 221 falls below a second workload threshold, the kernel 301 may switch the current core load from the big core 221 to an available little core 231. Here, the first and second workload thresholds may be equal or different with respect to other.

The switching operation provided by the kernel 301 may be performed between respective big/little cores lacking a predetermined "pair" relationship. In order to allow the kernel 301 to perform switching between heterogeneous (e.g., big and little) cores, the first cache 225 and second cache 235 may be used to synchronize data that is then communicated via the CCI 210. Due to the data synchronization between the caches 225 and 235 as connected by the CCI 210, a "switched-in core" (i.e., a core to which a current core load is transferred from a "switched-out core") may immediately begin execution of the transferred tasks.

The first cache 225 may be implemented as a cache memory included in each of the big cores 221, while the second cache 235 may be implemented as a cache memory included in each of the little cores 231. The kernel 301 may include a switcher 300 capable of switching in/out cores having different performance capabilities.

In certain embodiments, the kernel 301 and switcher 300 may be implemented by hardware capable of performing the afore-mentioned functions and operations, and/or as computer program code capable upon execution of performing the same functions and operations. Where implemented in software, wholly or in part, the software may be stored in various, conventionally understood electronic recording media.

When a current core load assigned to a little core 231 exceeds the capabilities of the little core 231 as indicated by the first workload threshold, the switcher 300 will switch at least one task from a set of tasks making up the current core load from the little core 231 to an available big core 221. Alternately, when a current core load assigned to a big core 221 is inappropriately less than capabilities of the big core 221 as indicated by the second workload threshold, but falls within the capabilities of an available little core 231, the switcher 300 will switch all of the remaining tasks of the current core load from the big core 221 to the little core 231.

Figure 3:
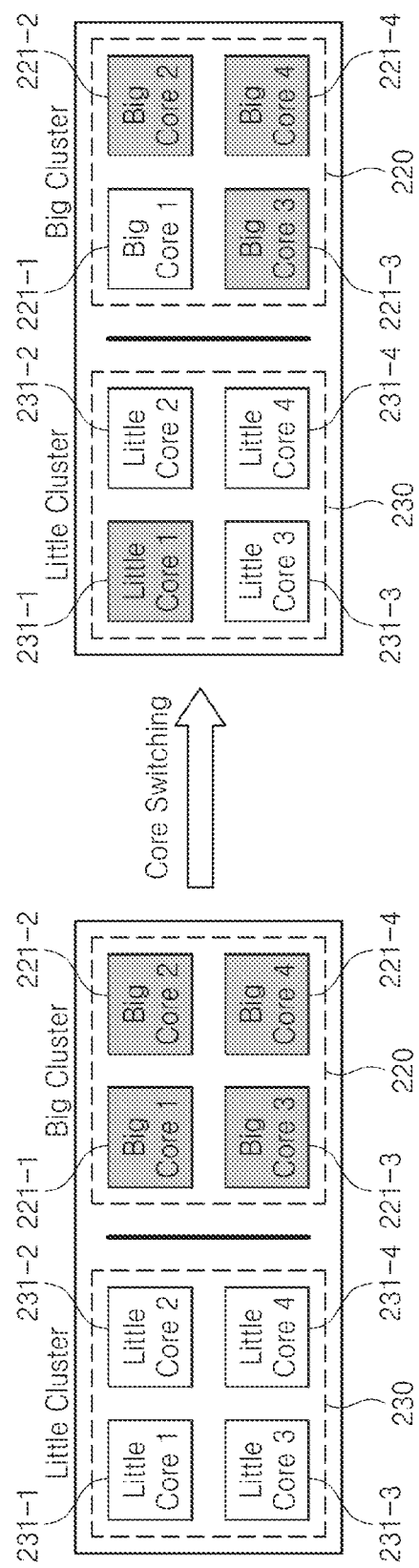
FIG. 3 is a conceptual diagram illustrating an 'in-kernel' switching operation that may be performed by the CPU of FIG. 2.

FIG. 3 is a conceptual diagram illustrating in one example an in-kernel switching operation that may be performed by the CPU 100 of FIGS. 1 and 2. Referring to FIGS. 1, 2 and 3, when in-kernel switching is used, each one of big cores 221-1 through 221-4 are assumed to be dynamically (or statically) and respectively mapped onto a corresponding one of little cores 231-1 through 231-4. Whether dynamically or statically mapped, the little cores 231-1 through 231-4 may correspond one-for-one with big cores 221-1 through 221-4.

Where a big core and a little core are mapped to each other, they are said to be a "core pair". For instance, a K-th core pair may include a K-th big core 221-K and a K-th little core 231-K , here K is a positive integer.

During the in-kernel switching operations described herein, only one core in each core pair is assumed to be selectively activated for sake of clarity of explanation. But this need not be the case in certain embodiments of the inventive concept.

Given defined core pair relationships, the kernel 301 may apply a particular dynamic voltage/frequency scaling (DVFS) relationship (using e.g., a corresponding DVFS table) to each core pair, where the particular DVFS relationship is a function (e.g.,) of the temperature(s) measured for the big cores 221-1 through 221-4.

Thus, according to certain embodiments of the inventive concept, the switcher 300 may perform "core switching" between big core(s) and little core(s) according to a DVFS relationship established for one or more thermal operating point(s) of each core pair. For instance, the switcher 300 may transfer a current core load from a first little core 231-1 to a first big core 221-1 of a first core pair, and then perform clock gating and/or power gating on the first little core 231-1.

Figure 4:
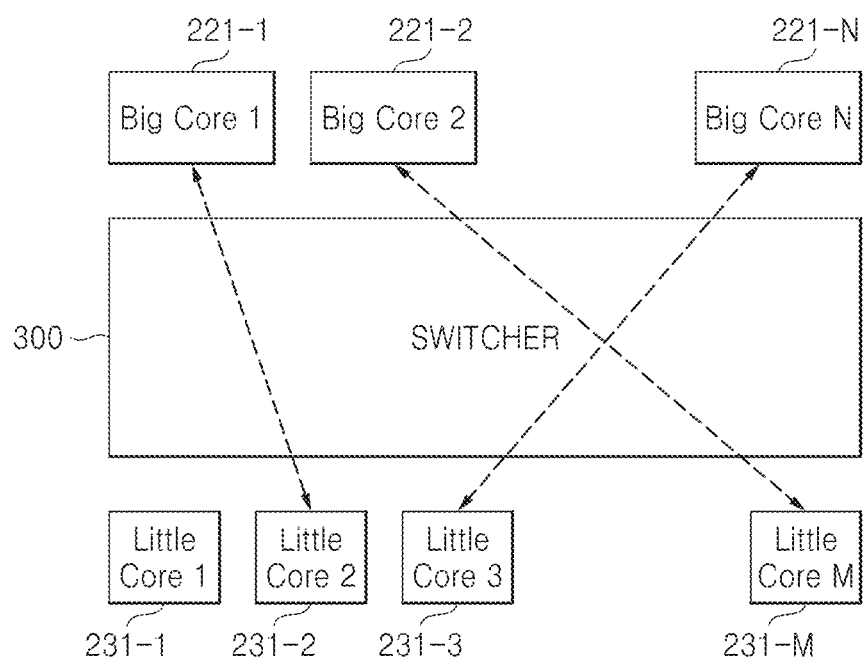
FIG. 4 is a block diagram further illustrating in one example the switcher 300 of FIG. 2.

FIG. 4 is a block diagram further illustrating in one example the switcher 300 of FIG. 2. Referring to FIG. 4, the switcher 300 is configured to selectively drive one or more big cores 221-1 through 221-N and/or little cores 231-1 through 231-M in accordance with overall CPU loading. For instance, when a current core load for the little core 231-3 exceeds a corresponding first workload threshold, the switcher 300 may switch one, some, or all of the assigned tasks making up the current core load for the little core 231-3 to a big core 221-N. Likewise, when the current core load for a big core 221-1 falls below a corresponding second workload threshold, but also falls within the capabilities of a little core 231-2, the switcher 300 may switch the tasks assigned to the big core 221-1 to the little core 231-2.

From the foregoing example, it may be understood one-for-one pairing relationships that control transfer of task assignments may be maintained between respective little and big cores. Alternately, tasks may be freely transferred between any two little and big cores, regardless of prior pair relationship definitions, if any.

Figure 5:
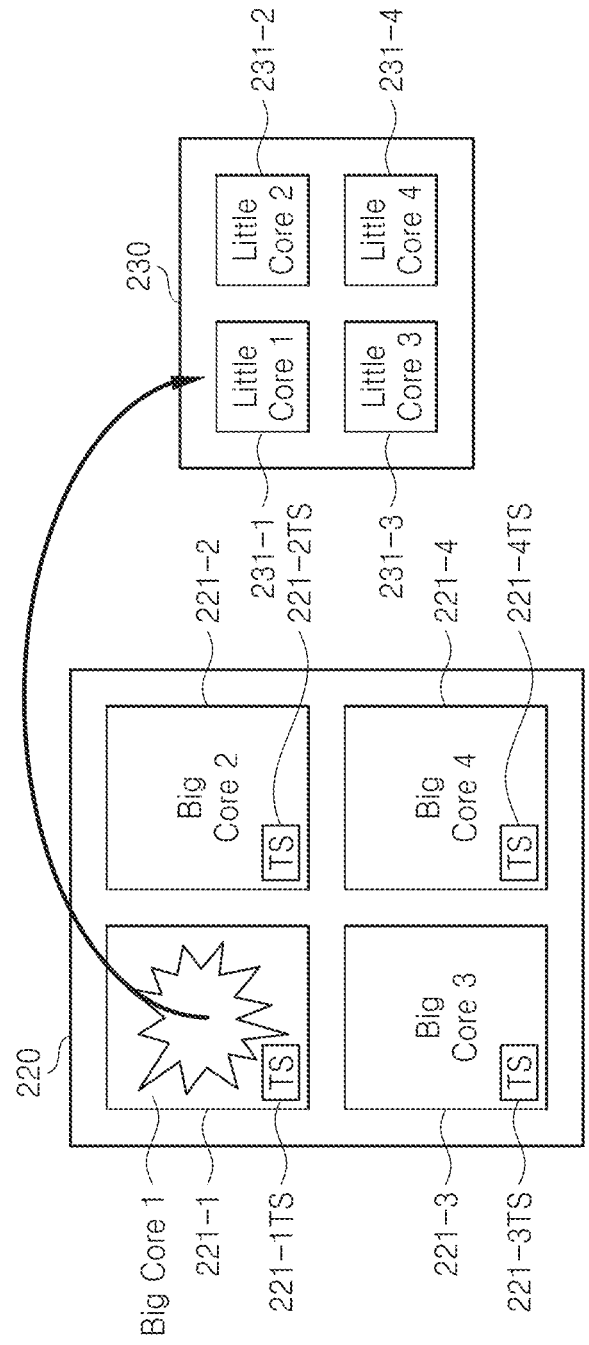
FIG. 5 is a conceptual diagram illustrating in one example operation of the CPU of FIG. 2 according to certain embodiments of the inventive concept.

FIG. 5 is a conceptual diagram illustrating in another example operation of the CPU 100 of FIGS. 1 and 2 according to certain embodiments of the inventive concept. Referring to FIGS. 1, 2, 3, 4, and 5, the respective temperature(s) of one or more of the big cores 221-1 through 221-4 may be monitored according to one or more defined "monitoring interval(s)" in relation to one or more "temperature threshold(s)". Thus, each one (or certain ones) of the big cores 221-1 through 221-4 may include a temperature sensor (e.g., 221-1TS) capable of measuring an operationally relevant temperature. Alternatively, the big cores 221-1 through 221-4 may not include an integral temperature sensor, but instead rely upon a separate module thermally adjacent to the big cores 221-1 through 221-4 and capable of measuring an operationally relevant temperature. However configured, one or more temperature sensors may be used to monitor temperature periodically or on a controlled interrupt basis.

Core switching between a big core and its corresponding little core may be performed in accordance with the temperature of the big core. For instance, a provided temperature sensor may generate an interrupt when the temperature of the first big core 221-1 reaches a first temperature threshold. In response to the generated interrupt, the current core load for the first big core 221-1 will be transferred by the switcher 300 to the first little core 231-1, and may thereafter perform clock gating and/or power gating for the first big core 221-1 in order to mitigate the adverse temperature indication.

Using various configurations of heterogeneous cores, at least one little core (e.g., 231-1) will be thermally safe to receive transfer of the current core load from the overheated big core 221-1. According to certain embodiments of the inventive concept, when heat-related performance "throttling" (e.g., clock gating and/or power gating) occurs for an overheated big core, only one or more small core(s) will be used to receive transferred tasks from the current core load of the big core. This approach prevents thermal attacks on big cores that may result from big core-to-little core load transfers, thereby increasing the stability of the overall electronic system.

According to predetermined conditions, the switcher 300 may respectively transfer one, some, or all of the tasks in respective current core load(s) for big cores 221-2 and 221-3 adjacent to the overheated first big core 221-1 to the little cores 231-2 and 231-3. Respective transfer(s) of core load(s) for one or more big core(s) adjacent to an overheated big core may be controlled in accordance with corresponding temperature thresholds by switcher 300. Thereafter, the switcher 300 may also selectively perform clock gating or power gating for the adjacent big cores 221-2 and 221-3.

In this manner overheated big cores may be very quickly cooled, thereby preventing additional thermal attack from surrounding components. And once the temperature of the overheated first big core 221-1 falls to an acceptable level, as indicated by another temperature threshold, the switcher 300 again assigned tasks for execution to the first big core 221-1.

Various temperature thresholds will be rationally assigned to not only protect vital circuitry from thermal damage, but also to avoid overly frequent load transfers.

Figure 6:
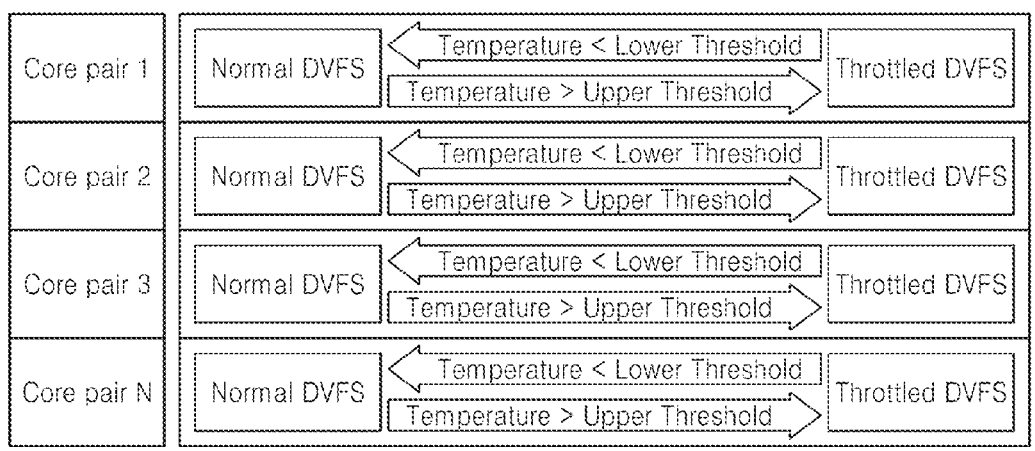
FIG. 6 is a conceptual diagram illustrating an exemplary dynamic voltage and frequency scaling (DVFS) policy that may be applied to core pairs.
Figure 7A:
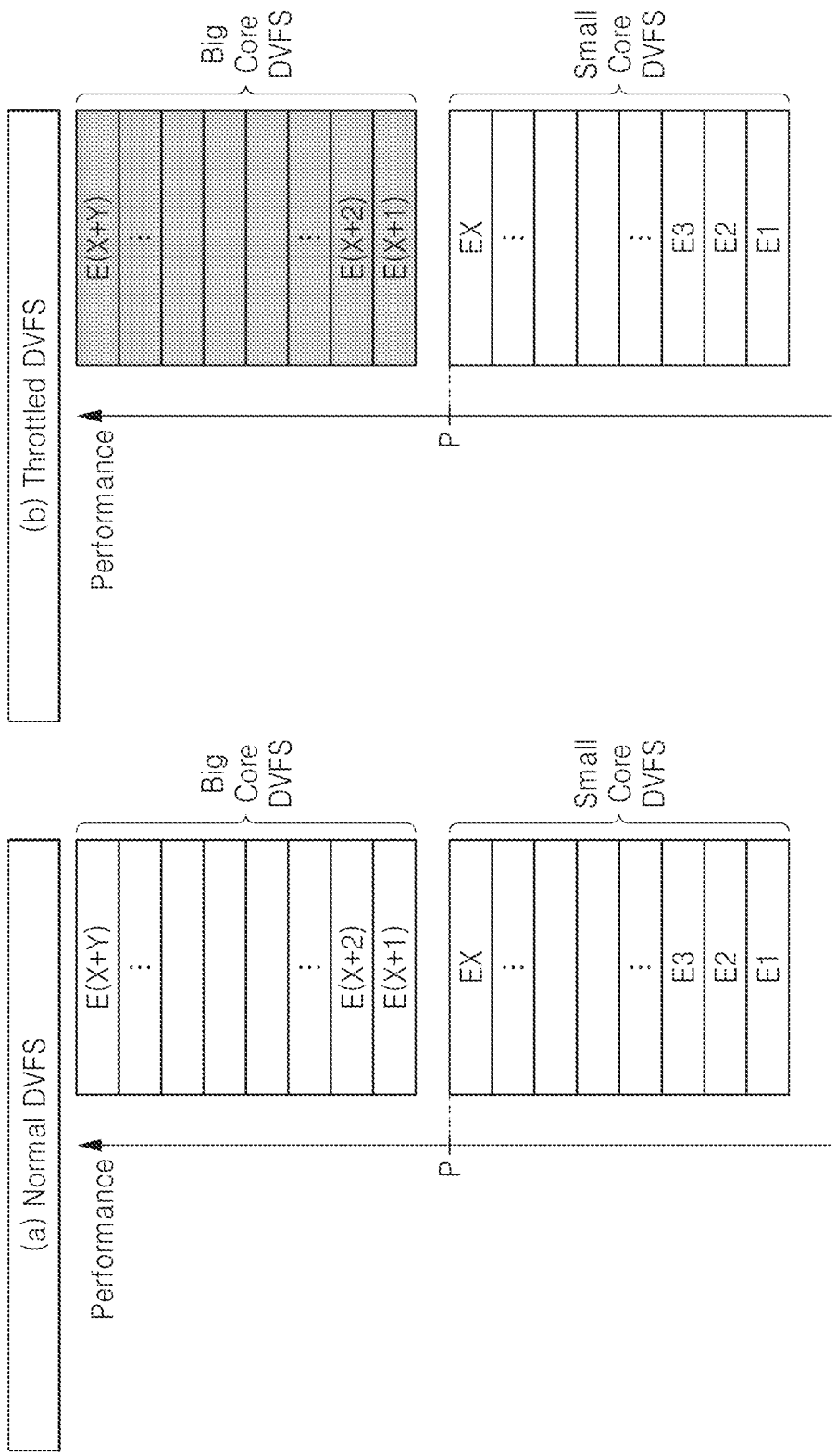
FIG. 7A is a conceptual diagram illustrating a core pair providing a range of performances according to a DVFS policy that may be used by certain embodiments of the inventive concept.

FIG. 6 is a conceptual diagram illustrating a DVFS policy that may be applied to a collection of core pairs. FIG. 7A is another conceptual diagram illustrating a range of available performance according to a DVFS policy in certain embodiments of the inventive concept. Referring to FIGS. 1, 2, 6, and 7A, each core pair is assumed to have a single job queue defining an overall core load to be processed in the heterogeneous core system.

The kernel 301 may be used to control each core pair. When big cores 221-1 through 221-N in core pairs 1 through N are not overheated, the kernel 301 may use a normal DVFS table during the execution of tasks flowing through the job queue for each of the core pairs 1 through N.

When the normal DVFS table is used, a core that can demonstrate performance capabilities matched to its current core load may be assigned corresponding tasks. Power gating may be performed on the other core dynamically or statically mapped to the core in each of the core pairs 1 through N. For instance, first through (X+Y)-th combinations E1 through E(X+Y) represent frequency and/or voltage. The first combination E1 may represent the lowest frequency and/or voltage and the (X+Y)-th combination may represent the highest frequency and/or voltage.

When the normal DVFS table is used, a small core in each core pair may be operated according to the first combination E1 when the workload of the process is the lowest and a big core in the core pair may be operated according to the (X+Y)-th combination E(X+Y) when the workload of the process is the highest.

When the big cores 221-1 through 221-N are used and the temperature of one (e.g., the first big core 221-1) of the big cores 221-1 through 221-N reaches a first temperature threshold, the current tasks loaded in the job queue associated with the overheated first big core 221-1 will be transferred to the corresponding first little core 231-1.

The kernel 301 may then apply a throttled DVFS table instead of the normal DVFS table to the first core pair—now including an overheated big core 221-1. According to certain embodiments of the inventive concept, the throttled DVFS table allows only performance range corresponding to the first little core 231-1 to be used. For instance, the throttled DVFS table may use only the first through X-th combinations E1 through EX. Therefore, under the control of the kernel 301 the first big core 221-1 in the first core pair may be power-gated or clock-gated, and the first little core 231-1 may be operated.

When a process requiring performance higher than a reference performance P and the throttled DVFS table is used, the first little core 231-1 may use the X-th combination EX. However, the inventive concept is not restricted to only this relationship.

Figure 7B:
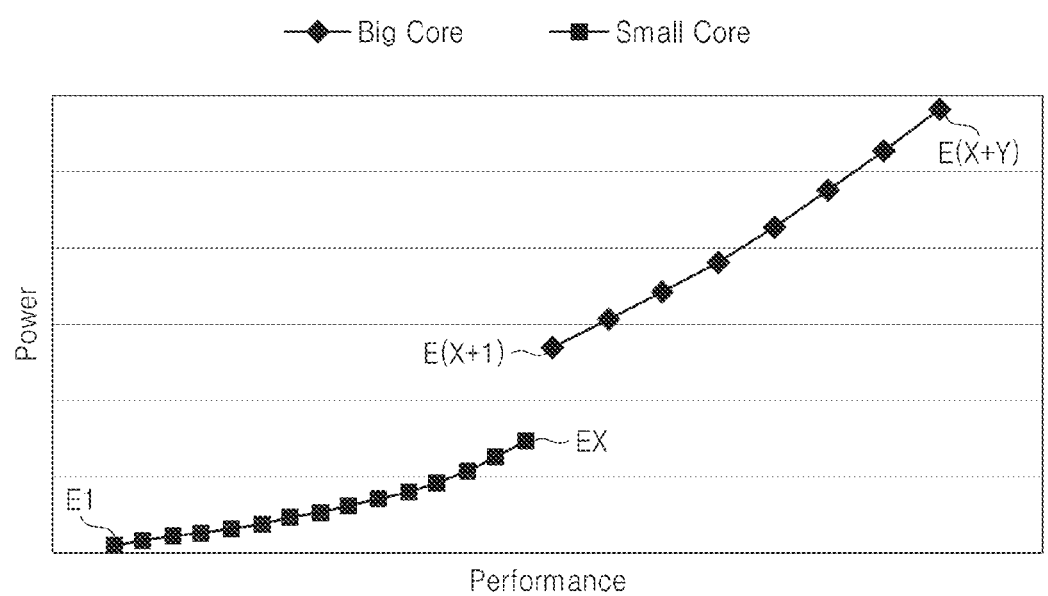
FIG. 7B is a graph illustrating a performance versus power relationship exhibited by the core pair of FIG. 7A.

FIG. 7B is a graph showing a performance versus power relationship for the core pair assumed for FIG. 7A. Referring to FIGS. 7A and 7B, when there is a change to execute the (X+1)-th combination E(X+1) since thermal throttling occurs in the first big core 221-1 that has been executing the (X+Y)-th combination E(X+Y), the first core pair consumes a lot of power due to the high temperature of the first big core 221-1.

When there is the change to execute the (X+1)-th combination E(X+1) since the first big core 221-1 is overheated, the first core pair can make performance only similar to the X-th combination EX of the first little core 231-1 even when executing a process requiring high performance. Accordingly, core load switching from the first big core 221-1 to the first little core 231-1 may be made so that the X-th combination EX is executed. As compared to conventionally executing the (X+1)-th combination E(X+1), when the switching is made to execute the X-th combination EX, power consumption decreases and operational stability increases while almost same performance is given.

Figure 7C:
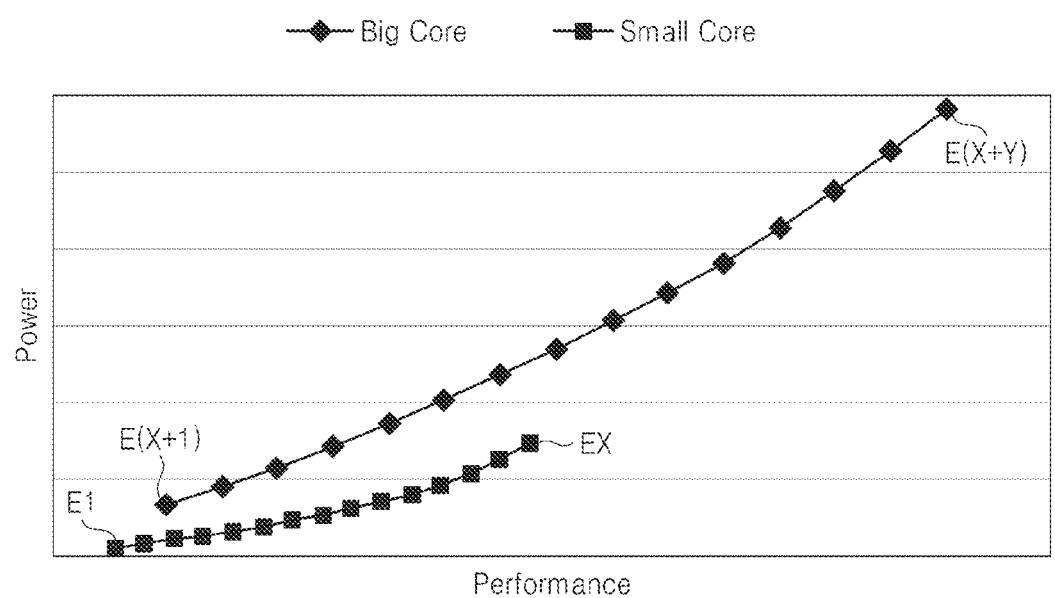
FIG. 7C is a graph illustrating comparative performance versus power relationships for a core pair according to certain embodiments of the inventive concept.

FIG. 7C is a graph showing comparative performance versus power relationships for a core pair according to certain embodiments of the inventive concept. Referring to FIG. 7C, a DVFS table may be defined such that performance of the big cores overlap the performance of small cores. In comparison of performance-power characteristics between big cores and small cores, when a small core is used instead of a big core, power is saved at the same level of performance, and overall performance may be improved at a given level of power consumption.

Referring back to FIGS. 1, 2, 6, and 7A, the kernel 301 may be used to apply the normal DVFS table instead of the throttled DVFS table to the first core pair, thereby operating the first big core 221-1 in the first core pair when the temperature of the first big core 221-1 is equal to or less than a second reference temperature.

In the embodiments illustrated in FIG. 7A, the normal DVFS table and the throttled DVFS table have the same combination values E1 through EX in the performance range corresponding to small cores. However, the normal DVFS table and the throttled DVFS table may have different values in the performance range corresponding to the small cores in other embodiments. For instance, the number of combinations below the reference performance P may be Z different from X in the throttled DVFS table where Z is an integer of at least 1. Z may be greater than X. Therefore, when a process is concentrated on small cores due to the overheating of big cores, the small cores are more efficiently controlled.

The normal DVFS table and the throttled DVFS table may be differently set according to the number of activated big cores. Alternatively, the normal DVFS table and the throttled DVFS table may be differently set according to the position of activated big cores. For instance, when multiple big cores are activated, or when adjacent big cores are activated, thermal damage may arise. Accordingly, the normal DVFS table or the throttled DVFS table of a corresponding core pair may be established with a lower operating frequency and voltage.

Figure 8:
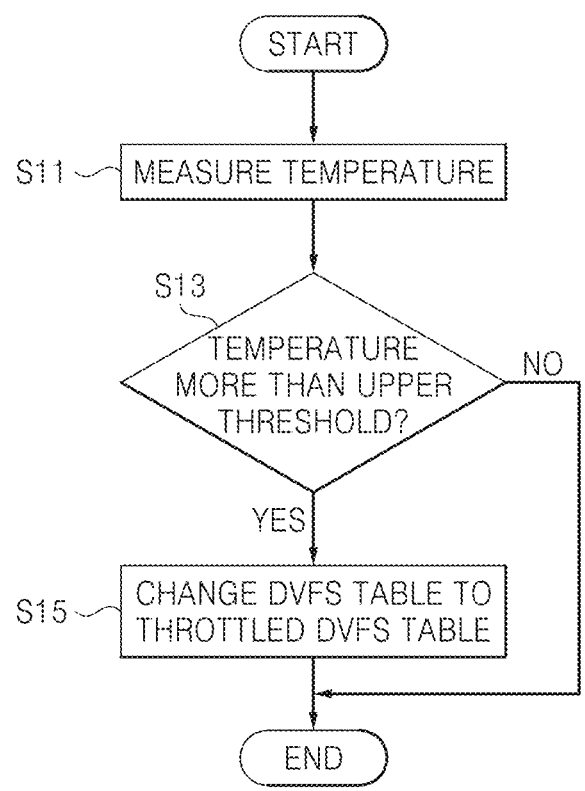
FIG. 8 is a flowchart summarizing a method of shifting from a normal DVFS table to a throttled DVFS table.

FIG. 8 is a flowchart summarizing in one example a method of shifting operation of the kernel 301 of FIG. 2 from being controlled by a normal DVFS table to a throttled DVFS table. Referring to FIG. 8, one or more temperature(s) of a big core is measured (S11). Then, it is determined whether the temperature of the big core is more than an upper (or first) temperature threshold (S13). When the temperature of the big core exceeds the upper threshold, a normal DVFS table for a current core pair is swapped for a throttled DVFS table (S15).

Figure 9:
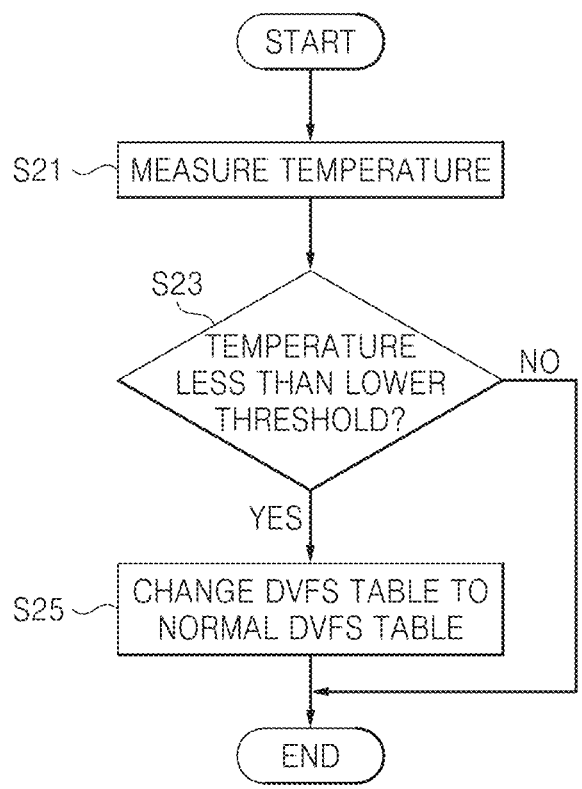
FIG. 9 is a flowchart summarizing a method of shifting from a throttled DVFS table to a normal DVFS table.

FIG. 9 is a flowchart summarizing in one example a method of shifting operation of the kernel 301 of FIG. 2 from being controlled by a throttled DVFS table to a normal DVFS table. Referring to FIG. 9, again the temperature of the big core is measured (S21). This may be continuously or periodically measured. Then, it is determined whether the temperature of the big core is less than a lower (or second) temperature threshold (S23). When the temperature of the big core falls below the lower threshold, the throttled DVFS table for a current core pair is swapped for the normal DVFS table (S25).

Figure 10:
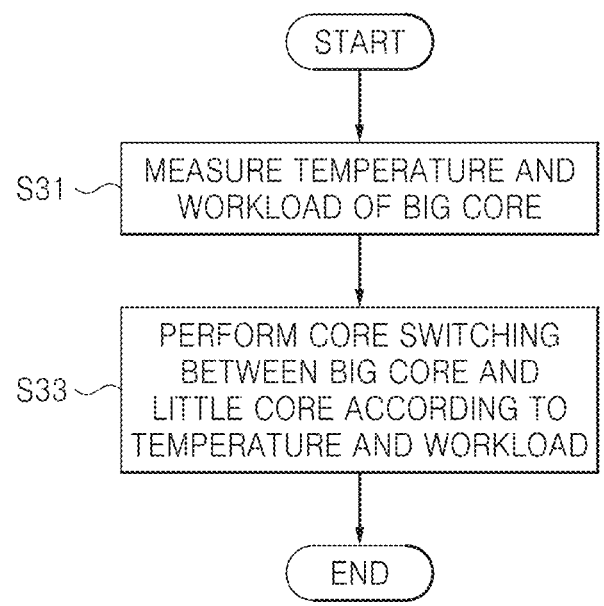
FIGS. 10 and 11 are respective flowcharts summarizing certain CPU operations according to various embodiments of the inventive concept.

FIG. 10 is a flowchart summarizing operations of the CPU 100 of FIG. 2 according to certain embodiments of the inventive concept. Referring to FIGS. 2, 3, and 10, both temperature and workload for each of the big cores 221-1 through 221-4 are measured (S31). Then, the switcher 300 may performs core switching between the big cores 221-1 through 221-4 and the little cores 231-1 through 231-4 in accordance with the temperature and workload measurements for the big cores 221-1 through 221-4 (S33).

Figure 11:
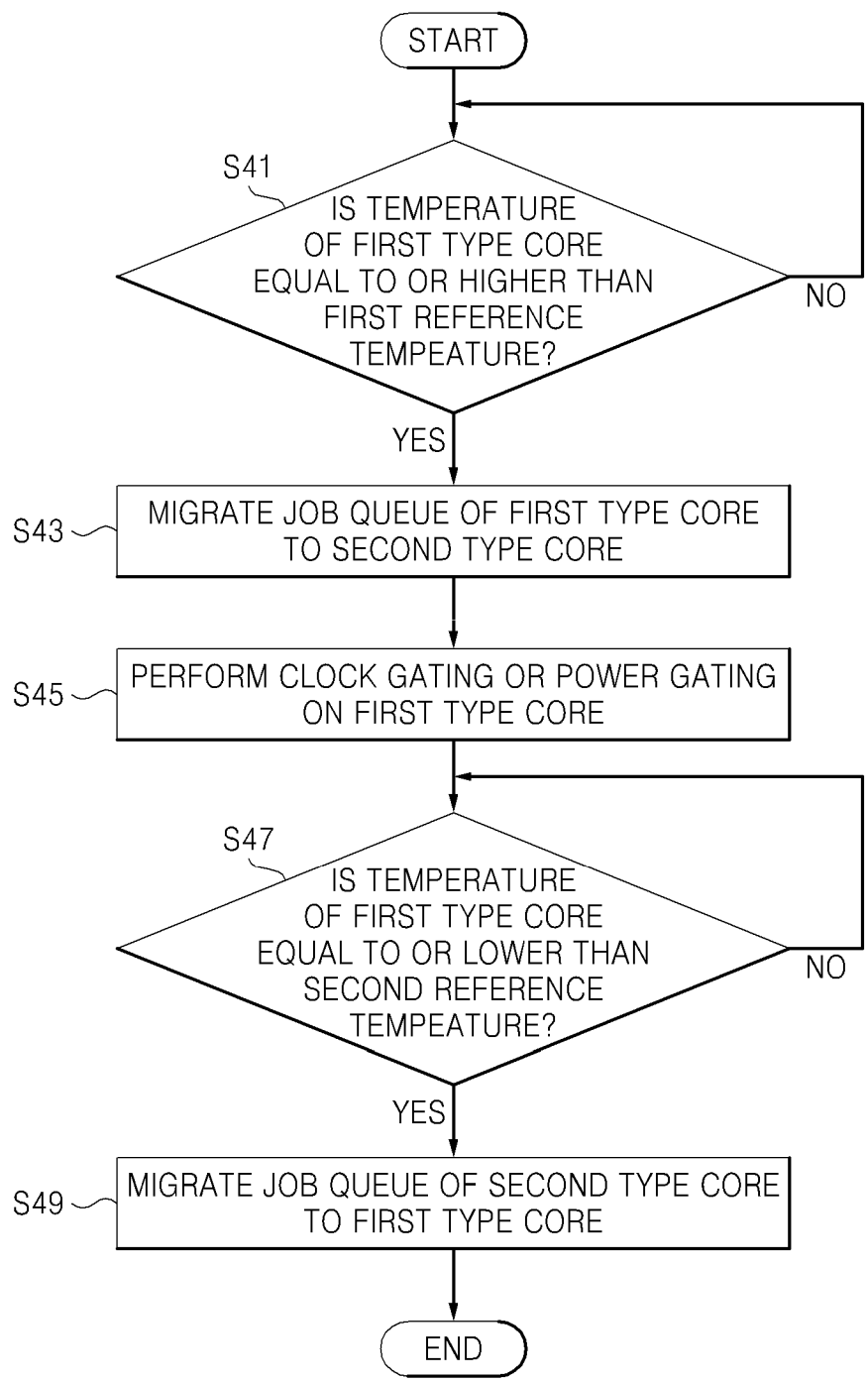

FIG. 11 is a flowchart summarizing operations of the CPU 100 of FIG. 2 according to certain embodiments of the inventive concept. Referring to FIGS. 2, 3, and 11, the kernel 301 determines whether temperature of a first type core, e.g., 221-1 is equal to or higher than the first reference temperature (S41).

When the temperature of the first type core 221-1 is equal to or higher than the first reference temperature, the kernel 301 migrates a job queue (or transfers the tasks making up the current core load) for the first type core 221-1 to a second type core, e.g., 231-1 (S43). Thereafter, the kernel 301 performs clock gating or power gating on the first type core 221-1 (S45).

According to certain embodiments of the inventive concept, the kernel 301 may determine whether the temperature of the first type core 221-1 is equal to or higher than a third reference temperature. When the temperature of the first type core is equal to or higher than the third reference temperature, the kernel 301 may respectively migrate job queues of the respective first type cores 221-2 and 221-3 adjacent to the first type core 221-1 to the second type cores 231-1 and 231-3 respectively corresponding to the adjacent first type cores 221-2 and 221-3.

The kernel 301 determines whether the temperature of the first type core 221-1 is equal to or lower than the second reference temperature (S47). When the temperature of the first type core 221-1 is equal to or lower than the second reference temperature, the kernel 301 migrates a job queue of the second type core 231-1 to the first type core 221-1 (S49).

Figure 12:
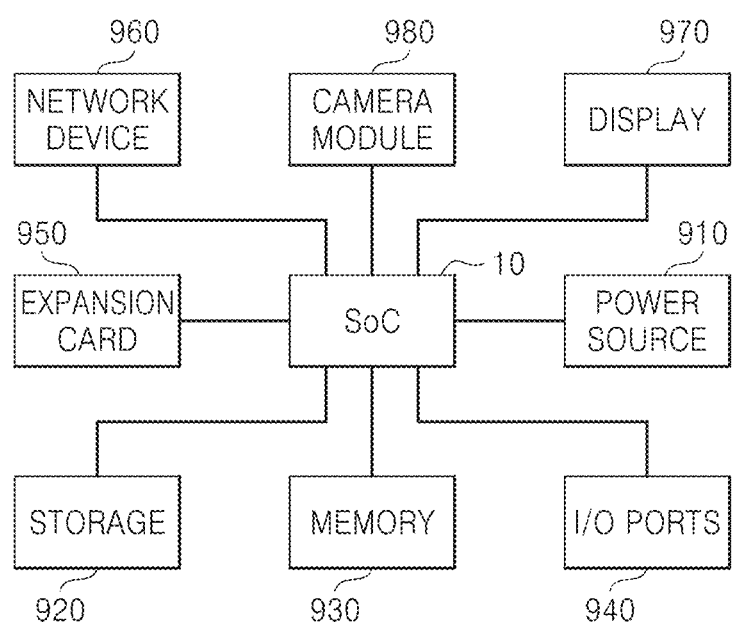
FIG. 12 is a block diagram illustrating an electronic system including the System-on-Chip (SoC) according to embodiments of the inventive concept.

FIG. 12 is a block diagram of an electronic system including the System-on-Chip (SoC) according to certain embodiments of the inventive concept. Referring to FIG. 12, the electronic system may be implemented as a personal computer (PC), a data server, or a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), portable navigation device(PND), a handheld game console, or an e(electronic)-book device.

The electronic system includes the SoC 10, a power source 910, a storage 920, a memory 930, I/O ports 940, an expansion card 950, a network device 960 and a display 970. The electronic system may also include a camera module 980.

The SoC 10 may include a central processing unit (CPU) 100 illustrated in FIG. 1. The CPU 100 may be a multi-core processor.

The SoC 10 may control the operation of at least one of the elements 910 through 980. The power source 910 may supply an operating voltage to at least one of the elements 910 through 980. The power source 910 may be controlled by the PMIC 40 illustrated in FIG. 1.

The storage 920 may be implemented by a hard disk drive (HDD) or a solid state drive (SSD).

The memory 930 may be implemented by a volatile or non-volatile memory and it may correspond to the external memory 30 illustrated in FIG. 1. A memory controller (not shown) that controls a data access operation, e.g., a read operation, a write operation (or a program operation), or an erase operation, on the memory 930 may be integrated into or embedded in the SoC 10. Alternatively, the memory controller may be provided between the SoC 10 and the memory 930.

The I/O ports 940 are ports that receive data transmitted to the electronic system or transmit data from the electronic system to an external device. For instance, the I/O ports 940 may include a port connecting with a pointing device such as a computer mouse, a port connecting with a printer, and a port connecting with a USB drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system to be connected with a wired or wireless network. The display 970 displays data output from the storage 920, the memory 930, the I/O ports 940, the expansion card 950, or the network device 960. The display 970 may be the display device 20 illustrated in FIG. 1.

The camera module 980 converts optical images into electrical images. Accordingly, the electrical images output from the camera module 980 may be stored in the storage 920, the memory 930, or the expansion card 950. Also, the electrical images output from the camera module 980 may be displayed through the display 970.

As described above in relation to selected embodiments of the inventive concept, core switching between heterogeneous cores may be performed in response to one or more temperature thresholds measured in the heterogeneous multi-core architecture, so that temperature conditions for any one application processor may be satisfied and efficient thermal management may be enabled because of the physically different cores being used.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A method of operating an electronic system including a heterogeneous multi-core processor comprising a big core cluster comprising a plurality of big cores including a first big core and a second big core, and a little core cluster including a first little core and a second little core, wherein the first and second big cores are respectively high-performance/high-power consumption cores and the first and second little cores are respectively low-performance/low-power consumption cores, and wherein the first big core and first little core are mapped together as a first core pair and the second big core and second little core are mapped together as a second core pair, the method comprising:
measuring a temperature of the first big core using a temperature sensor;
switching at least one task from a first current core load assigned the first big core to the first little core when the measured temperature of the first big core exceeds a first temperature threshold;
switching at least one task from a second current core load assigned the second big core to the second little core, provided the second big core is physically adjacent to the first big core in the plurality of big cores, when the measured temperature of the first big core exceeds a second temperature threshold higher than the first temperature threshold;
applying respectively different dynamic voltage and frequency scaling (DVFS) tables to the first core pair and second core pair in response to a measured temperature for the first big core exceeding a first temperature threshold, and further in response to a determination that the second big core is physically adjacent to the first big core.

2. The method of claim 1, further comprising:
wherein the switching of the at least one task from the first current core load to the first little core comprises in-kernel switching such that only one of the first big core and first little core in the first core pair is activated at any given time, and
the switching of the at least one task from the second current core load to the second little core comprises in-kernel switching such that only one of the second big core and second little core in the second core pair is activated at any given time.

3. The method of claim 1, further comprising:
performing at least one of clock gating and power gating on at least one of the first big core and the second big core until the measured temperature of the first big core falls below a third temperature threshold less than the first temperature threshold.

4. The method of claim 3, wherein the switching of the at least one task from the first current core load to the first little core comprises migrating a first job queue storing remaining tasks of the first current core load for the first big core to the first little core, and
the switching of the at least one task from the second current core load to the second little core comprises migrating a second job queue storing remaining tasks of the second current core load for the second big core to the second little core.

5. The method of claim 4, wherein the migrating of the first job queue for the first big core to the first little core comprises swapping use of a first normal dynamic voltage and frequency scaling (DVFS) table for the first big core for use of a first throttled DVFS table defining a performance range for only the first little core, and the migrating of the second job queue for the second big core to the second small core comprises swapping use of a second DVFS table for the second big core for use of a second throttled DVFS table defining a performance range for only the second little core.

6. The method of claim 5, wherein the first normal DVFS table and the first throttled DVFS table are different from each other in defining respective performance ranges for the first little core, and the second normal DVFS table and the second throttled DVFS table are different from each other in defining respective performance ranges for the second little core.

7. The method of claim 5, wherein the first and second normal DVFS tables and the first and second throttled DVFS tables vary according to a number of activated big cores among a plurality of big cores in the heterogeneous multi-core processor.

8. The method of claim 1, further comprising:

switching the first current core load from the first little core back to the first big core when the measured temperature of the first big core falls below a third temperature threshold; and switching the second current core load from the second little core back to the second big core when the measured temperature of the first big core falls below a fourth temperature.

9. An electronic system comprising:

a heterogeneous multi-core processor comprising;

a plurality of big cores including a first big core and a second big core, and a plurality of little cores including a first little core and a second little core, wherein the first big core and first little core are mapped together as a first core pair and the second big core and second little core are mapped together as a second core pair, and the first big core and second big core are respectively high-performance and high-power consumption relative to the first little core and second little core; and a kernel configured to respectively apply different dynamic voltage and frequency scaling (DVFS) tables to the first core pair and second core pair in response to a measured temperature for the first big core exceeding a first temperature threshold, and further in response to a determination that the second big core is physically adjacent to the first big core.

10. The electronic system of claim 9, wherein the kernel is configured to apply a first normal DVFS table to the first core pair and a second normal DVFS table to the second core pair, so long as the measured temperature of the first big core remains less than or equal to the first temperature threshold, and the kernel is further configured to apply a first throttled DVFS table to the first core pair and a second throttled DVFS table to the second core pair when the measured temperature of the first big core exceeds the first temperature threshold.

* * * * *